(12) United States Patent
Tanaka

(10) Patent No.: US 9,251,575 B2
(45) Date of Patent: Feb. 2, 2016

(54) IMAGE PROCESSING APPARATUS, IMAGE PICKUP APPARATUS, IMAGE PROCESSING METHOD, AND IMAGE PROCESSING PROGRAM

(71) Applicant: CANON KABUSHIKI KAISHA, Tokyo (JP)

(72) Inventor: Shin Tanaka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/124,323

(22) PCT Filed: Dec. 3, 2012

(86) PCT No.: PCT/JP2012/007731
§ 371 (c)(1),
(2) Date: Dec. 6, 2013

(87) PCT Pub. No.: WO2013/094131
PCT Pub. Date: Jun. 27, 2013

(65) Prior Publication Data
US 2014/0104458 A1 Apr. 17, 2014

(30) Foreign Application Priority Data
Dec. 19, 2011 (JP) .................................. 2011-277732

(51) Int. Cl.
*G06T 5/20* (2006.01)
*G06T 5/00* (2006.01)
(Continued)

(52) U.S. Cl.
CPC . *G06T 5/20* (2013.01); *G06T 5/002* (2013.01); *H04N 5/23212* (2013.01); *H04N 5/2621* (2013.01); *G06T 2207/20021* (2013.01)

(58) Field of Classification Search
None
See application file for complete search history.

(56) References Cited

U.S. PATENT DOCUMENTS 7,412,110 B1 * 8/2008 Worthington ............. G06T 5/20
382/276
8,767,254 B2 * 7/2014 Loce et al. .................... 358/1.9
(Continued)

FOREIGN PATENT DOCUMENTS

| JP | 2000-207549 A | 7/2000 |
|---|---|---|
| JP | 2010-039946 A | 2/2010 |

(Continued)

OTHER PUBLICATIONS

Michael Kass, "Interactive Depth of Field Using Simulated Diffusion on a GPU". Tech Report Jun. 2001, Pixar Animation Studios, 2006.
(Continued)

*Primary Examiner* — Albert Cutler
(74) *Attorney, Agent, or Firm* — Rossi, Kimms & McDowell LLP

(57) ABSTRACT

An image processing apparatus 1 includes an image region dividing portion 105 configured to divide a shot image into a plurality of image regions so that an amount of change of an image quality is within a predetermined range when the shot image is blurred using a blur kernel depending on an object distance and an angle of view of the shot image, a blur kernel generating portion 106 configured to calculate the blur kernel for each image region divided by the image region dividing portion 105, and an image processing calculating portion 107 configured to generate a blur-added image by performing a convolution calculation for the shot image using the blur kernel calculated by the blur kernel generating portion 106.

10 Claims, 3 Drawing Sheets

(51) Int. Cl.
*H04N 5/262* (2006.01)
*H04N 5/232* (2006.01)

(56) References Cited

U.S. PATENT DOCUMENTS

| | | | |
|---|---|---|---|
| 2005/0220358 A1* | 10/2005 | Blonde et al. | 382/264 |
| 2009/0096897 A1* | 4/2009 | Saito | G06T 7/0081 348/241 |
| 2010/0045825 A1* | 2/2010 | Hatori | G02B 7/36 348/241 |
| 2011/0169921 A1* | 7/2011 | Lee | H04N 5/23212 348/46 |
| 2011/0222734 A1* | 9/2011 | Angot | G06K 9/00201 382/106 |
| 2011/0310267 A1* | 12/2011 | Ichiyama et al. | 348/222.1 |
| 2012/0007942 A1* | 1/2012 | Michrowski | H04N 5/272 348/14.08 |
| 2012/0219236 A1* | 8/2012 | Ali | G06T 5/002 382/276 |

FOREIGN PATENT DOCUMENTS

| | | |
|---|---|---|
| JP | 2010-226694 A | 10/2010 |
| JP | 2011-091570 A | 5/2011 |

OTHER PUBLICATIONS

Todd J. Kosloff, "Three Techniques for Rendering Generalized Depth of Field Effects". 2009 Proceedings of the Fourth SIAM Conference on Mathematics for Industry.

International Application No. PCT/JP2012/007731 Search Report, dated Jan. 8, 2013.

* cited by examiner

ALLOWABLE LIMIT
EVALUATION
PARAMETER I

OBJECT DISTANCE

IMAGE PROCESSING APPARATUS, IMAGE PICKUP APPARATUS, IMAGE PROCESSING METHOD, AND IMAGE PROCESSING PROGRAM

This application is a U.S. National Phase Application of PCT International Application PCT/JP2012/007731 filed on Dec. 3, 2012 which is based on and claims priority from JP 2011-277732 filed on Dec. 19, 2011 the contents of which is incorporated in its entirety by reference.

TECHNICAL FIELD

The present invention relates to an image processing apparatus that generates a blur-added image from a shot image.

BACKGROUND ART

Recently, a compact digital camera which has a large-size image sensor to obtain a good blur is proposed. However, when the size of the image sensor is large, it is difficult to reduce the size of the camera since an imaging optical system is also enlarged. Patent Literature 1 (PLT 1) discloses a camera that adds a blur by obtaining information of an object distance while taking an image of substantially a deep focus (an image of an in-focus state for all regions) and performing a predetermined image processing for a shot image. Non-Patent Literature 1 (NPL 1) discloses, with respect to a method of adding the blur, a method of using information of an imaging optical system to use an analytical function such as Gaussian or a thermal diffusion equation. Non-Patent Literature 2 (NPL2) discloses a configuration of performing a high-speed processing for such an image processing with hardware using an accelerator such as GPU.

CITATION LIST

Patent Literature

[PTL 1] Japanese Patent Laid-Open No. 2000-207549
[NPL 1] "Three Techniques for Rendering Generalized Depth of Field Effects" (2009 Proceedings of the Fourth SIAM Conference on Mathematics for Industry)
[NPL 2] "Interactive Depth of Field Using Simulated Diffusion on a GPU" (tech. report 06-01, Pixar Animation Studios, 2006)

SUMMARY OF INVENTION

Technical Problem

However, when the blur is intended to be added to image data containing continuous distance changes, a large amount of calculation is necessary. In NPL 2, the calculation time is decreased by performing a high-speed processing with hardware using the GPU, but it does not reduce the amount of calculation itself. In order to reduce the amount of calculation, although a method of applying a limit to an object side or a method of treating the continuous distance changes as a discontinuous data is considered, an image which does not have a sense of distance is obtained or the blur of the image is unnatural.

The present invention provides an image processing apparatus, an image pickup apparatus, an image processing method, and an image processing program capable of generating a blur-added image with a small amount of calculation.

Solution to Problem

An image processing apparatus as one aspect of the present invention includes an image region dividing portion configured to divide a shot image into a plurality of image regions so that an amount of change of an image quality is within a predetermined range when the shot image is blurred using a blur kernel depending on an object distance and an angle of view of the shot image, a blur kernel generating portion configured to calculate the blur kernel for each image region divided by the image region dividing portion, and an image processing calculating portion configured to generate a blur-added image by performing a convolution calculation for the shot image using the blur kernel calculated by the blur kernel generating portion.

An image pickup apparatus as another aspect of the present invention includes the image processing apparatus.

An image processing method as another aspect of the present invention includes the steps of determining an image region in which an amount of change of an image quality is within a predetermined range when a shot image is blurred using a blur kernel depending on an object distance and an angle of view of the shot image, and dividing the shot image into the image region, calculating the blur kernel for each divided image region, and generating a blur-added image by performing a convolution calculation for the shot image using the blur kernel calculated for each image region.

An image processing program as another aspect of the present invention makes an information processing apparatus to execute an image processing method, and the method includes the steps of determining an image region in which an amount of change of an image quality is within a predetermined range when a shot image is blurred using a blur kernel depending on an object distance and an angle of view of the shot image, and dividing the shot image into the image region, calculating the blur kernel for each divided image region, and generating a blur-added image by performing a convolution calculation for the shot image using the blur kernel calculated for each image region.

Further features and aspects of the present invention will become apparent from the following description of exemplary embodiments with reference to the attached drawings.

Advantageous Effects of Invention

According to the present invention, an image processing apparatus, an image pickup apparatus, an image processing method, and an image processing program capable of generating a blur-added image with a small amount of calculation can be provided.

DESCRIPTION OF EMBODIMENTS

Figure 1:
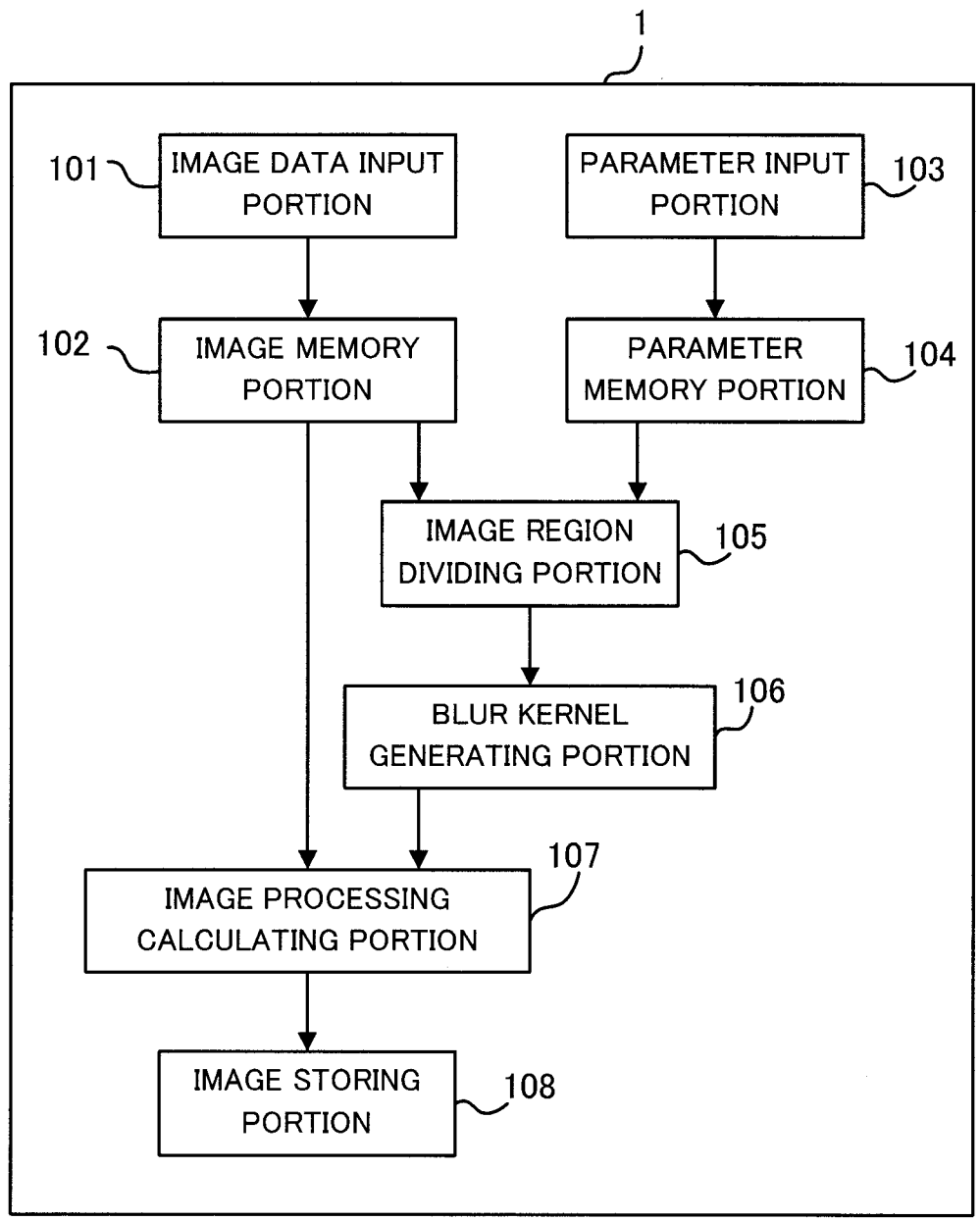
FIG. 1 is a block diagram of an image processing apparatus in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, referring to FIG. 1, a configuration of an image processing apparatus in Embodiment 1 of the present invention will be described. FIG. 1 is a block diagram of an image processing apparatus in the present embodiment. An image processing apparatus 1 includes an image data input portion 101, an image memory portion 102, a parameter input portion 103, a parameter memory portion 104, an image region dividing portion 105 (an image region divider), a blur kernel generating portion 106 (a blur kernel generator), an image processing calculating portion 107 (an image processor), and an image storing portion 108 (an image storage).

The image data input portion 101 brings (inputs) image data that indicates an image shot by an image pickup apparatus or a two-dimensional luminance value generated by computer graphics (CG) and distance data that indicates a distance (an object distance) corresponding to the image data. The image memory portion 102 stores the image data and the distance data inputted to the image data input portion 101. The parameter input portion 103 brings (inputs) image information, an allowable condition in dividing an image region, and information related to a blur kernel (various kinds of parameter data). The parameter memory portion 104 stores the various kinds of parameter data inputted to the parameter input portion 103.

The image region dividing portion 105 determines a shift invariant region (an image region) based on the image data and the distance data stored in the image memory portion 102 and the various kinds of parameter data stored in the parameter memory portion 104 so as to divide the image. The shift invariant region is an image region which is allowable even if the blur kernel is assumed to be the same when a blur is added to the image so as to generate a blur-added image. Thus, the image region dividing portion 105 divides a shot image into a plurality of image regions so that an amount of change of an image quality is within a predetermined range when the shot image is blurred using a blur kernel depending on an object distance and an angle of view of the shot image. In other words, the image region dividing portion 105 determines the shift invariant region where the amount of change of the image quality is within the predetermined range when the shot image is blurred using the blur kernel depending on the object distance and the angle of view of the shot image, and it divides this shot image into the shift invariant regions. A specific dividing method of the shift invariant region will be described below. The term "in a predetermined range" means that an amount of change of the image quality caused by the difference of the blur kernel depending on the object distance and the angle of view of the shot image is within an allowable limit, which is determined based on the following allowable limit evaluation parameter I.

The blur kernel generating portion 106 calculates the blur kernel for each shift invariant region divided by the image region dividing portion 105. The image processing calculating portion 107 performs a calculation processing that adds an effect of the blur kernel to the image data stored in the image memory portion 102 based on the blur kernel calculated by the blur kernel generating portion 106 so as to generate the blur-added image. In other words, the image processing calculating portion 107 performs a convolution calculation for the shot image using the blur kernel calculated by the blur kernel generating portion 106 so as to generate the blur-added image. The image storing portion 108 stores the blur-added image generated by the image processing calculating portion 107.

Figure 2:
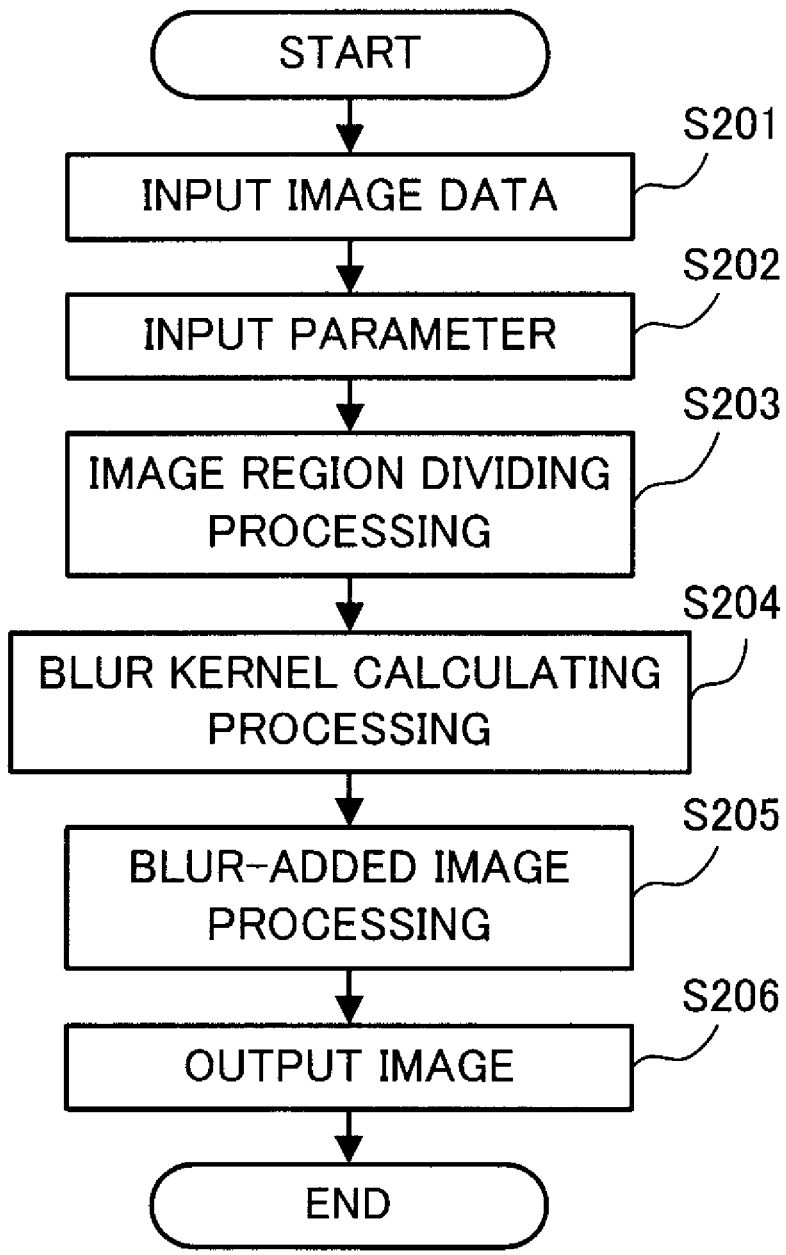
FIG. 2 is a flowchart of illustrating an operation of the image processing apparatus in Embodiment 1.

Next, referring to FIG. 2, the operation of the image processing apparatus 1 (the image processing method) in the present embodiment will be described. FIG. 2 is a flowchart of illustrating the operation of the image processing apparatus 1, which illustrates processings of generating the blur-added image based on the input image data and parameter using the image processing apparatus 1 up to storing the blur-added image in an image output apparatus (not shown) so as to be displayed.

First of all, in Step S201, the image data input portion 101 inputs the image data such as an image shot by the image pickup apparatus or an image generated by the computer graphics, and distance data corresponding to the image data or data used to be converted into the distance data. The image data or the distance data inputted to the image data input portion 101 are stored in the image memory portion 102.

The data used to be converted into the distance data are, for example parallax information generated by using image information from a plurality of image pickup apparatuses, in addition to direct distance data such as a relative distance from a position of a point of view in the input image data or a position in a certain global coordinate. Furthermore, data that are required to obtain the distance using technologies of Computational Photography are also included. For example, in a technology called "Depth From Defocus", the distance (the object distance) is obtained based on an analysis of an amount of blur. Additionally, there are various kinds of methods. As described below, finally, since a shape or a size of the blur kernel is determined based on the distance data, the shape or the size of the blur kernel may also be determined directly. A defocus amount that is calculated by using the distance data and a focus position that is one of parameters of a shooting condition inputted in Step S202 described below may also be used as input data.

Subsequently, in Step S202, the parameter input portion 103 inputs various kinds of parameters such as a parameter of the shooting condition, a parameter necessary for determining the allowable limit in an image region dividing processing described below, and a parameter necessary for determining the shape or the size of the blur kernel. The various kinds of parameters inputted to the parameter input portion 103 are stored in the parameter memory portion 104. With respect to the parameter of the shooting condition, necessary information is determined by the image region dividing processing or the blur kernel calculating processing.

Figure 3:
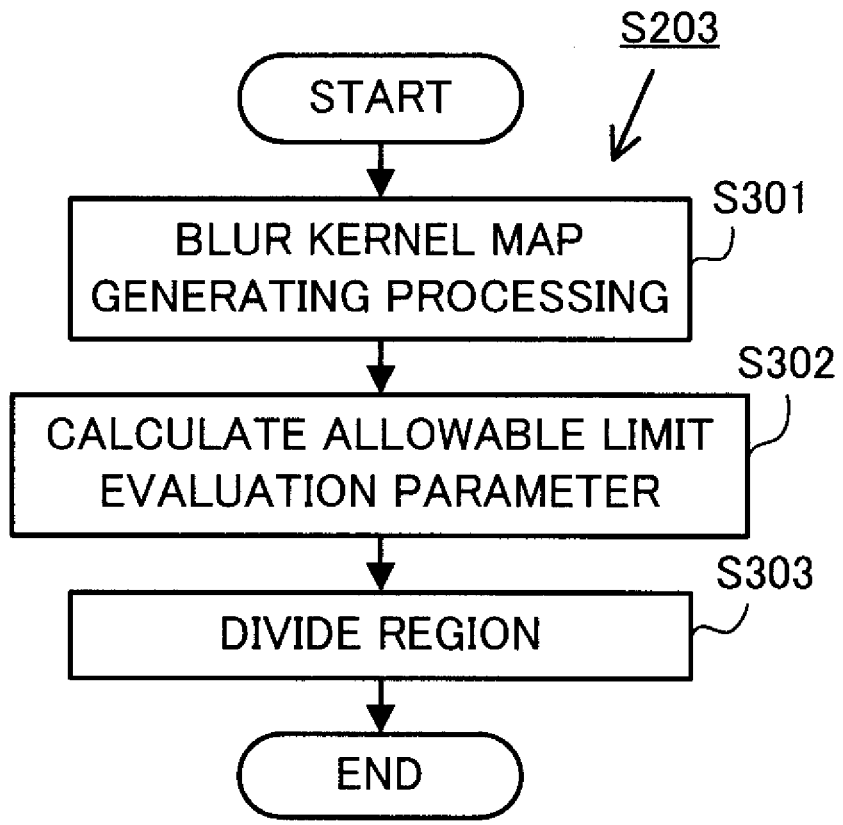
FIG. 3 is a flowchart of illustrating an image region dividing processing that is performed by an image region dividing portion in Embodiment 1.

Next, in Step S203, the image region dividing portion 105 performs the image region dividing processing that determines the shift invariant region (the image region) in processing the blur-added image so as to divide the image. Referring to FIG. 3, this image region dividing processing (Step S203) will be described in details. FIG. 3 is a flowchart of illustrating the image region dividing processing performed by the image region dividing portion 105 (Step S203).

First of all, in Step S301, the image region dividing portion 105 generates a blur kernel map (a blur kernel generating processing). The blur kernel map is a data group related to the shape or the size of the blur kernel corresponding to three-dimensional space information such as an object distance or an angle of view. When considering it in accordance with a real optical system, PSF (Point Spread Function) may be measured in accordance with the object distance or the angle of view, or alternatively a value previously calculated through a simulation may be stored. When considering a virtual blur kernel, an expression representing the relationship between the object distance or the angle of view and the blur kernel only needs to be prepared. The image region dividing portion 105, for example, generates the blur kernel using a response function measured or calculated by the optical system or an analytical function such as Gaussian or thermal diffusion equation. The analytical function means a function that is used to generate a predetermined blur kernel, which is a function represented by a predetermined expression. In this case, it is not necessary to be limited to a blur kernel formed by a general optical system, and it may be arbitrarily determined in a desired manner.

Next, in Step S302, the image region dividing portion 105 calculates the allowable limit evaluation parameter. The allowable limit evaluation parameter is a parameter related to the blur kernel. As a first evaluation parameter, there is a parameter that represents the size or the shape of the blur kernel. For example, it is a variance when the blur kernel has Gaussian distribution. Even when the image region is determined by using a different basis without performing the calculation using the variance, the variance when the blur kernel has the Gaussian distribution only needs to correspond to the division of the image region eventually.

As a second evaluation parameter, there is a parameter that is calculated using spatial frequency characteristics of the blur kernel. For example, a Fourier transform is performed for the blur kernel so as to calculate the allowable limit evaluation parameter using MTF (Modulation Transfer Function) that is an absolute value of the optical transfer function OTF. In this case, the allowable limit evaluation parameter I is represented as the following Expression (1).

[Math 1]

$$I = \int_{\mu_1}^{\mu_2} MTF(\mu) d\mu \quad (1)$$

In Expression (1), $\mu$ is a spatial frequency, $\mu_1$ and $\mu_2$ are constants that set the upper limit and the lower limit of the spatial frequency $\mu$, respectively. The allowable limit evaluation parameter I is obtained by integrating MTF with the spatial frequency $\mu$. In this case, the Fourier transform is also performed for the image data to be able to use the frequency characteristics of the image data. The allowable limit evaluation parameter I that is obtained as the first evaluation parameter or the second evaluation parameter described above can be compared between kernel data of various kinds of object distances or angles of view.

Subsequently, in Step S303, the image region dividing portion 105 divides a region of the image (the image data) stored in the image memory portion 102 using the allowable limit evaluation parameter I calculated in Step S302. In the present embodiment, an allowable limit threshold value T that corresponds to the allowable limit evaluation parameter I is prepared, and an image region where the amount of change of the allowable limit evaluation parameter I is not more than the allowable limit threshold value T in the image data is treated as the shift invariant region. In other words, this image region is a region where the same blur kernel is used, and an entire image region is divided into the shift invariant regions. The allowable limit threshold value T may be contained in the parameters inputted in Step S202, or alternatively it is a value that is previously set.

Figure 4:
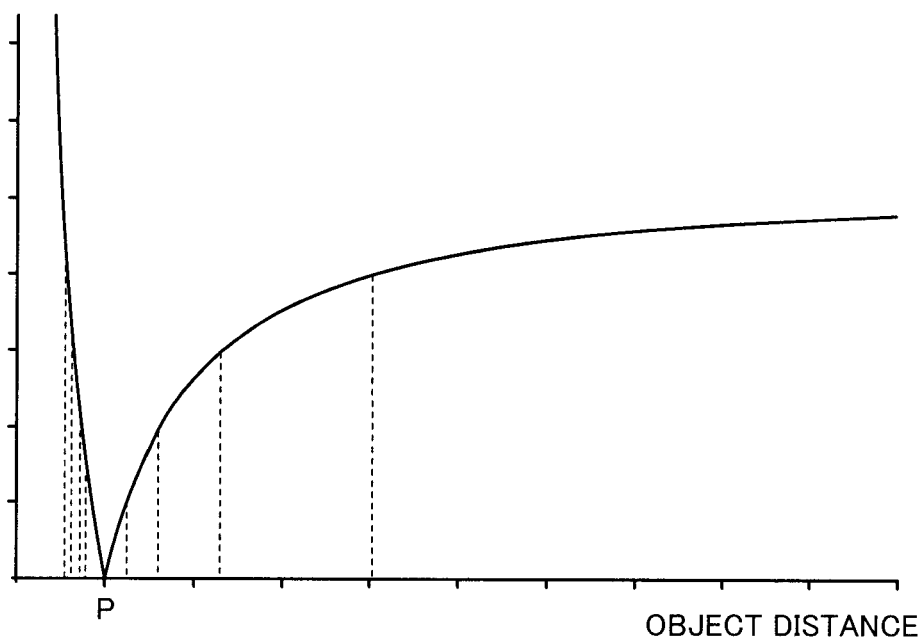
FIG. 4 is a diagram of illustrating a relationship between an allowable limit evaluation parameter I and an object distance (a region division result) in Embodiment 1.

For example, FIG. 4 is a diagram of illustrating the relationship between the allowable limit evaluation parameter I and the object distance (the region division result) when a blur having Gaussian distribution intends to be added equivalently to the changes of the blur amount of the real optical system. In FIG. 4, a lateral axis indicates the object distance, and a vertical axis indicates the allowable limit evaluation parameter I. In the present embodiment, since the allowable limit evaluation parameter I is set to be the variance of the Gaussian distribution, the allowable limit evaluation parameter I is 0 (zero) at an in-focus position P. When the object distance is divided in accordance with the allowable limit threshold value T based on the relationship between the allowable limit evaluation parameter I and the object distance, the division regions are determined as indicated by dotted lines in FIG. 4. In other words, the blur kernels generated in front of and behind the dotted line are different from each other.

Subsequently, in Step S204 of FIG. 2, the blur kernel generating portion 106 calculates the blur kernel for each image region (the shift invariant region) divided in Step S203. Specifically, the blur kernel generating portion 106 calculates a blur kernel (a blur kernel map) similar to that generated in Step S301 for each divided image region. If such a blur kernel map is stored by previously calculating or measuring it, the stored blur kernel may also be used. The blur kernel may be stored by calculating it for each divided image region, or alternatively only a relation with the divided image region may be stored. In such a configuration, the blur kernel corresponding to each divided image region is determined.

Next, in Step S205, the image processing calculating portion 107 generates the blur-added image using the image data stored in the image memory portion 102 and the blur kernel calculated by the blur kernel generating portion 106 (the blur kernel corresponding to each divided image region). Specifically, the image processing calculating portion 107 performs the convolution calculation for the image data related to the shot image and the blur kernel.

When image data in a certain divided image region is P, and a blur kernel corresponding to the divided image region is B, the convolution of the image data P and the blur kernel B is represented as the following Expression (2).

[Math 2]

$$(P \otimes B)(x,y) = \iint P(x',y') B(x-x',y-y') dx'dy' \quad (2)$$

Expression (2) is a calculation of one pixel in the divided image region. Therefore, performing the calculation of Expression (2) for all pixels in the divided image region, the calculation of the blur-added image in the divided image region can be performed. In the present embodiment, the same blur kernel is used in the divided image region. Accordingly, using the convolution theorem, Expression (2) is represented as the following Expression (3) and an amount of calculation for the blur-added image can be reduced.

[Math 3]

$$(P \otimes B)(x,y) = IFT\{FT[P(x,y)] \cdot FT[B(x,y)]\} \quad (3)$$

In Expression (3), FT denotes the two-dimensional Fourier transform, and IFT denotes the two-dimensional inverse Fourier transform.

Performing the calculation represented by Expression (3) for all of the divided image regions that are divided by the image region dividing portion 105, an effect of addition of the blur is given to the image data inputted by the image data input portion 101, i.e. the blur-added image can be generated.

Subsequently, in Step S206, the image processing calculating portion 107 outputs the blur-added image and the image storing portion 108 stores the blur-added image.

According to the image processing apparatus of the present embodiment, a shift invariant region corresponding to an arbitrary image and blur kernel (a region that is assumed to have the same difference of the blur kernel) can be calculated. As a result, while keeping the image quality of a shot image, an amount of calculation of the blur kernel is reduced to be able to perform a convolution calculation.

Embodiment 2

Next, an image processing apparatus in Embodiment 2 of the present invention will be described. The present embodiment determines the allowable limit evaluation parameter I, considering frequency characteristics of the blur kernel and also spatial frequency characteristics of the vision. Specifically, the present embodiment is different from Embodiment 1 only in the method of calculating the allowable limit evaluation parameter I in Step S302 described with reference to FIG. 3, and other configurations and processing methods are the same as those of Embodiment 1.

In the present embodiment, when the allowable limit evaluation parameter I is calculated using the spatial frequency characteristics (MTF) of the blur kernel and the spatial frequency characteristics of the vision, a value of CMTA (Cascaded Modulation Transfer Acutance) is used. CMTA will be described below, which is described in "NEW IMAGE ANALYSIS HANDBOOK" (Tokyo University Press, pp 77-78) for details.

The shift invariant region can be determined using the method described in Embodiment 1. However, it is known that the vision of human has distinctive spatial frequency characteristics, and there are a spatial frequency of indicating a massive reaction for the changes of the spatial frequency, and a frequency of indicating a small reaction for the changes. Therefore, weighting MTF of the blur kernel in accordance with the spatial frequency characteristics of the vision, the shift invariant region is set to be a region where a human cannot sense the changes, and the allowable limit evaluation parameter I can be determined more precisely.

The MTF for the spatial frequency of the vision is known as CSF (Contrast Sensitivity Function). The CSF is modeled considering characteristics of a low-pass filter in an imaging system of the eyeball and characteristics of a band-pass filter in a signal processing system from the retina to the brain. One example of CSF is represented by the following Expression (4).

[Math 4]

$$CSF(f) = a \cdot f \exp(-b \cdot f) \quad (4)$$

In Expression (4), f is a spatial frequency, which is represented by a unit [cycle/deg] that indicates a number of contrast stripes that a human can see within one degree of vision. Commonly, a value of "a" is 75 and a value of "b" is 0.2, but these values of "a" and "b" are not fixed and they change in accordance with various conditions in an evaluation environment.

A value that is obtained by normalizing an integral value of a product of MTF and CSF of the blur kernel in a certain spatial frequency range is called SQF (Subjective Quality Factor), and when the MTF of the blur kernel is represented as MTF, SQF is represented by the following Expression (5).

[Math 5]

$$SQF = \frac{\int_{f_1}^{f_2} MTF(f) \cdot CSF(f) \, df}{\int_{f_1}^{f_2} CSF(f) \, df} \quad (5)$$

In Expression (5), f is a spatial frequency, and $f_1$ and $f_2$ are constants that set the upper limit and the lower limit of the spatial frequency, respectively.

CMTA is obtained by normalizing SQF (Subjective Quality Factor) to 100 using Weber-Fechner's law so that SQF is linearized for a sense of a human. The Weber-Fechner's law is a law that the sense of a human is proportional to logarithm of stimulus, and CMTA is formulated as represented by the following Expression (6).

[Math 6]

$$CMTA = 100 + 66 \log_{10}(SQF) \quad (6)$$

Using CTMA as the allowable limit evaluation parameter I, the shift invariant region in which the spatial frequency characteristics of the vision is reflected can be determined. Thus, the image region dividing portion 105 determines the shift invariant region using a ratio (SQF) of an integrated value of the multiplication of the spatial frequency characteristics of the blur kernel and the spatial frequency of the vision and an integrated value of the spatial frequency of the vision.

According to the image processing apparatus of the present embodiment, using an evaluation value (a division evaluation value) using the CMTA, the shift invariant region in which a human cannot sense the changes of the blur kernel can be automatically calculated. As a result, while keeping the image quality of a shot image in accordance with the vision of a human, an amount of calculation of the blur kernel is reduced to be able to perform a convolution calculation.

The image processing apparatus of each embodiment can also be applied to an image pickup apparatus, and an image processing program that makes an information processing apparatus (a computer) to execute an image processing method of each embodiment can also be used. Therefore, according to each embodiment, an image processing apparatus, an image pickup apparatus, an image processing method, and an image processing program capable of generating a blur-added image with a small amount of calculation can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

An image processing apparatus, an image pickup apparatus, an image processing method, and an image processing program capable of generating a blur-added image with a small amount of calculation can be provided.

REFERENCE SIGNS LIST

1 IMAGE PROCESSING APPARATUS
101 IMAGE DATA INPUT PORTION
102 IMAGE MEMORY PORTION
103 PARAMETER INPUT PORTION
104 PARAMETER MEMORY PORTION

105 IMAGE REGION DIVIDING PORTION
106 BLUR KERNEL GENERATING PORTION
107 IMAGE PROCESSING CALCULATING PORTION
108 IMAGE STORING PORTION

The invention claimed is:

1. An image processing apparatus comprising:
an image region dividing portion configured to divide a shot image into a plurality of image regions so that an amount of change of an image quality in each of the plurality of image regions is within a predetermined range when the shot image is blurred using a blur kernel depending on an object distance and an angle of view of the shot image;
a blur kernel generating portion configured to generate a plurality of blur kernels for the respective image regions divided by the image region dividing portion; and
an image processing calculating portion configured to generate a blur-added image by performing a convolution calculation for the shot image using the blur kernels generated by the blur kernel generating portion.

2. The image processing apparatus according to claim 1, wherein the image region dividing portion determines an image region of the plurality of image regions using a size of the blur kernel.

3. The image processing apparatus according to claim 1, wherein an image region of the plurality of image regions corresponds to a variance when the blur kernel has Gaussian distribution.

4. The image processing apparatus according to claim 1, wherein the image region dividing portion determines an image region of the plurality of image regions using spatial frequency characteristics of the blur kernel that is represented by a response function measured or calculated by an optical system or an analytical function.

5. The image processing apparatus according to claim 4, wherein the image region dividing portion determines the image region of the plurality of image regions using further spatial frequency characteristics of a vision which changes depending on an evaluation environment.

6. The image processing apparatus according to claim 5, wherein the image region dividing portion determines the image region of the plurality of image regions using a ratio of an integrated value of a multiplication of the spatial frequency characteristics of the blur kernel and the spatial frequency of the vision and an integrated value of the spatial frequency of the vision.

7. The image processing apparatus according to claim 1, wherein the image region dividing portion divides the shot image into the plurality of image regions depending on spatial frequency characteristics of the blur kernel.

8. An image pickup apparatus comprising an image processing apparatus comprising:
an image region dividing portion configured to divide a shot image into a plurality of image regions so that an amount of change of an image quality in each of the plurality of image regions is within a predetermined range when the shot image is blurred using a blur kernel depending on an object distance and an angle of view of the shot image;
a blur kernel generating portion configured to generate a plurality of blur kernels for the respective image regions divided by the image region dividing portion; and
an image processing calculating portion configured to generate a blur-added image by performing a convolution calculation for the shot image using the blur kernels generated by the blur kernel generating portion.

9. An image processing method comprising:
determining a plurality of image regions in which an amount of change of an image quality in each of the plurality of image regions is within a predetermined range when a shot image is blurred using a blur kernel depending on an object distance and an angle of view of the shot image, and dividing the shot image into the plurality of image regions;
generating a plurality of blur kernels for the respective divided image regions; and
generating a blur-added image by performing a convolution calculation for the shot image using the blur kernels generated for the respective image regions.

10. A non-transitory computer-readable storage device storing an image processing program which makes an information processing apparatus to execute an image processing method, the method comprising:
determining a plurality of image regions in which an amount of change of an image quality in each of the plurality of image regions is within a predetermined range when a shot image is blurred using a blur kernel depending on an object distance and an angle of view of the shot image, and dividing the shot image into the plurality of image regions;
generating a plurality of blur kernels for the respective divided image regions; and
generating a blur-added image by performing a convolution calculation for the shot image using the blur kernels generated for the respective image regions.

* * * * *